A. D. WHITMORE.
Folding-Chair.
No. 6,711. Reissued Oct. 19, 1875.
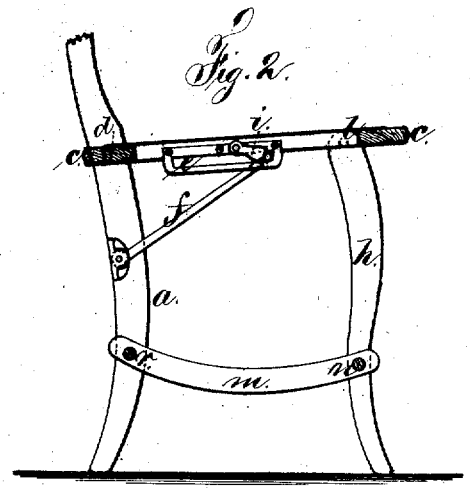
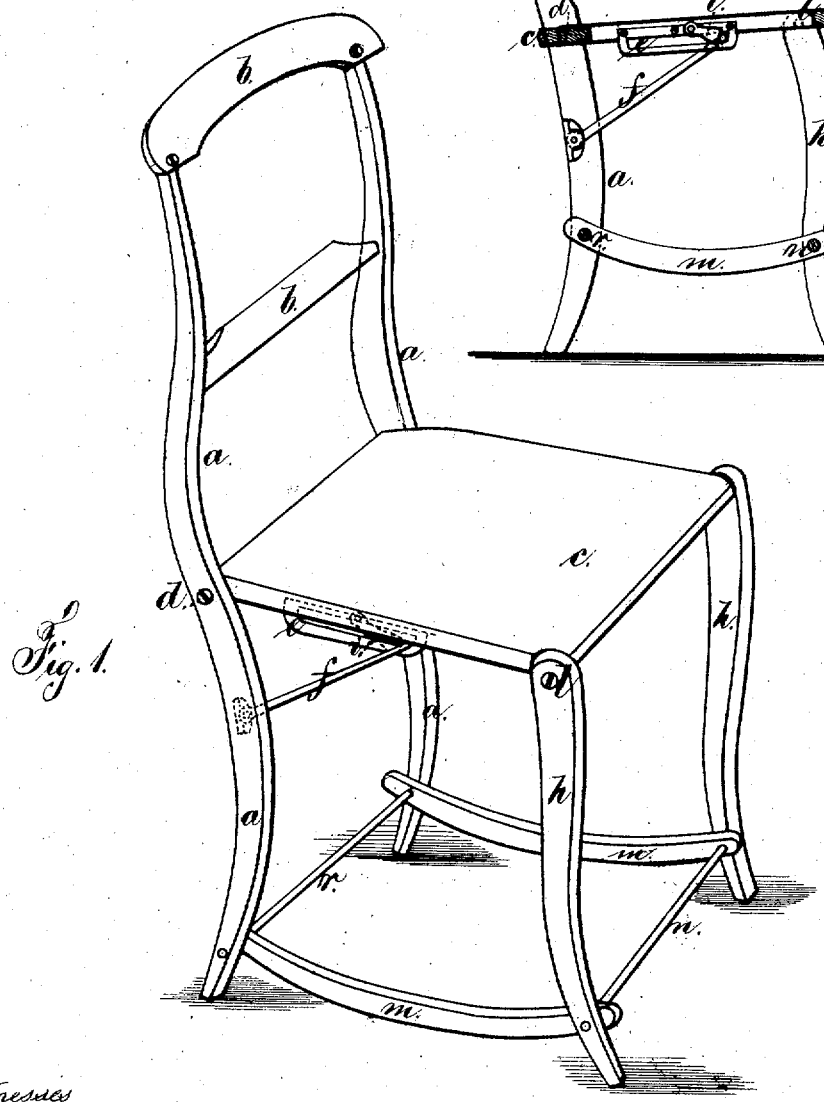
Witnesses
Chas. F. Smith
Geo. T. Pinckney
Inventor
Albert D. Whitmore
per Lemuel W. Serrell
atty.

UNITED STATES PATENT OFFICE.

ALBERT D. WHITMORE, OF HOUSATONIC, MASSACHUSETTS, ASSIGNOR TO EDWARD W. VAILL.

IMPROVEMENT IN FOLDING CHAIRS.

Specification forming part of Letters Patent No. 40,526, dated November 3, 1863; reissue No. 6,711, dated October 19, 1875; application filed April 14, 1875.

*To all whom it may concern:*

Be it known that I, ALBERT D. WHITMORE, of Housatonic, in the county of Berkshire and State of Massachusetts, have invented an Improvement in Folding Chairs, of which the following is a specification:

This chair is made with one frame forming the back and back legs, and the folding seat is jointed to this back-frame, and there is a brace that serves to hold the seat in its proper position when the chair is folded. This brace extends from the back-frame below the seat to a slot at the under part of the seat, so that the seat is held in the proper relative position to the back-frame.

In the drawing, Figure 1 is a perspective view of the chair, and Fig. 2 is a section through the seat and back-frame.

The back-frame is composed of the side pieces *a a* and the cross-pieces or rails *b*, and the rigid seat or seat-frame *c* is hinged to this back-frame at *d*, and swings upwardly against the back when the chair is folded. The pivots connect the seat or seat-frame directly to the back legs, instead of the seat being hinged to a cross-bar and folding downwardly, as heretofore employed. The seat of the chair may be made a frame, *c*, and filled in with cane or flag, or covered with carpet or any other suitable material; or the seat may be a wood bottom of itself, constituting the frame. When the seat is in position for use it is held firmly by the diagonal braces *f*, extending from the side pieces to the slotted guide *e*, that is at the under side of the seat. The diagonal brace is arrested at the end of the slot, so that the seat cannot fold downwardly as the back of the chair is lifted or tipped, and drop-buttons or catches *i* serve to hold the braces in the other direction. These are moved out of the way when the chair is folded. The back-frame extends down below the seat, and forms the back legs of the chair, instead of the legs that support the seat being folding ×-legs, as have heretofore been generally used in folding chairs.

In chairs containing folding ×-legs the front legs extend up and are united to, or prolonged to form, the back, and the back legs extend forward to the front edge of the seat-frame.

In my folding chair the back and back legs form one frame, and the legs do not cross.

The front legs *h* of the chair are attached to the seat by the pivot-pins or hinges *l*, and the bars *m m* are pivoted at their ends to the front and back legs, respectively, and the cross bar or rail *n* connects the front legs *h h*, and the cross bar or rail *r* connects the back legs *a a*, so the lower portions of the legs are sustained in position relatively to each other; but the chair can be folded for packing or transportation.

I claim as my invention—

1. The folding chair made with the back and back legs forming one frame, in combination with a seat-frame that passes in between the back legs, and is pivoted directly to such legs, substantially as set forth.

2. In a folding chair with the back and back legs in one frame, the combination of a diagonal brace, rigid seat or seat-frame, and front legs connected with such seat, substantially as set forth.

3. The combination, in a folding chair, of a frame forming the back and back legs, a seat, front legs, connections from the back legs to the front legs, and diagonal brace, substantially as set forth.

4. The combination, in a folding chair, of a seat and back frame hinged together, and diagonal braces, extending from the side pieces *a a*, and connected with slotted guides at the seat, substantially as set forth.

Signed by me this 19th day of March, A. D. 1875.

A. D. WHITMORE.

Witnesses:
CHAS. M. BALL,
E. C. WHITMORE.